(12) United States Patent
Harris et al.

(10) Patent No.: US 9,681,638 B1
(45) Date of Patent: Jun. 20, 2017

(54) WHEELED LITTER-SIFTING CART

(71) Applicants: Bryan Harris, Kokomo, IN (US); Lisa Harris, Kokomo, IN (US)

(72) Inventors: Bryan Harris, Kokomo, IN (US); Lisa Harris, Kokomo, IN (US)

( * ) Notice: Subject to any disclaimer, the term of this patent is extended or adjusted under 35 U.S.C. 154(b) by 0 days.

(21) Appl. No.: 15/277,314

(22) Filed: Sep. 27, 2016

(51) Int. Cl.
- *B07B 1/00* (2006.01)
- *A01K 1/01* (2006.01)
- *B62B 5/06* (2006.01)
- *B62B 3/00* (2006.01)
- *B07B 1/28* (2006.01)

(52) U.S. Cl.
CPC ............... *A01K 1/01* (2013.01); *B07B 1/005* (2013.01); *B07B 1/28* (2013.01); *B62B 3/002* (2013.01); *B62B 5/06* (2013.01)

(58) Field of Classification Search
CPC .... A01K 1/01; B07B 1/00; B07B 1/46; B62B 3/00
USPC .......................................................... 209/235
See application file for complete search history.

(56) References Cited

U.S. PATENT DOCUMENTS

| | | | |
|---|---|---|---|
| 75,043 A | 3/1868 | Morrison | |
| 3,252,169 A * | 5/1966 | Propst | A61G 1/0293 5/628 |
| 3,254,811 A * | 6/1966 | Harris | B65D 25/14 206/457 |
| 5,032,254 A * | 7/1991 | Deboer | A01K 1/0107 119/161 |
| 5,853,189 A * | 12/1998 | Swartzlander | B62B 1/20 280/47.24 |
| 6,267,080 B1 | 7/2001 | Roy | |
| 7,562,025 B2 * | 7/2009 | Mallett | B07C 7/005 206/366 |
| 2016/0200337 A1 * | 7/2016 | Abel | B62B 3/005 280/86 |

FOREIGN PATENT DOCUMENTS

CN 103843666 A 6/2014

* cited by examiner

*Primary Examiner* — Terrell Matthews

(57) ABSTRACT

The wheeled litter-sifting cart is a device that is adapted to store containers of cat litter as well as to sift out used cat litter for disposal of waste and potential re-use of cat litter. The wheeled cart is mobilized via a plurality of wheels that are affixed to a cart frame. The cart frame includes a bottom deck, intermediate deck, and a top deck. The bottom deck, the intermediate deck, and the top deck are all parallel with respect to one another, and are equally spaced elevationally, speaking. The top deck includes a first opening adjacent to a second opening. A hinged sifter is attached to the top deck in between the first opening and the second opening. In use, a first bucket is aligned underneath the first opening, a second bucket is aligned underneath the second opening, and soiled cat litter is sifted via the hinged sifter.

4 Claims, 5 Drawing Sheets

WHEELED LITTER-SIFTING CART

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cat litter, more specifically, a wheeled cart that is able to sift soiled litter for reuse.

SUMMARY OF INVENTION

The wheeled litter-sifting cart is a device that is adapted to store containers of cat litter as well as to sift out used cat litter for disposal of waste and potential re-use of cat litter. The wheeled cart is mobilized via a plurality of wheels that are affixed to a cart frame. The cart frame includes a bottom deck, intermediate deck, and a top deck. The bottom deck, the intermediate deck, and the top deck are all parallel with respect to one another, and are equally spaced elevationally, speaking. The top deck includes a first opening adjacent to a second opening. A hinged sifter is attached to the top deck in between the first opening and the second opening. In use, a first bucket is aligned underneath the first opening, a second bucket is aligned underneath the second opening, and soiled cat litter is sifted via the hinged sifter. Unused cat litter passes through the hinged sifter into the second bucket located underneath the second opening. Next, the clumps of spent cat litter and animal waste are transferred to the first bucket upon rotation of the hinged sifter from above the second opening over to the first opening. The intermediate deck includes bucket guides that aid in alignment of the first bucket and second bucket with respect to the first opening and the second opening, respectively.

It is an object of the invention to provide a cart that is configured to store kitty litter as well as a means of sifting out used cat litter.

It is a further object of the invention to provide a hinged sifter that works to separate clumps of used cat litter and animal waste from un-soiled cat litter, and subsequently dump said clumps into a designated bucket.

These together with additional objects, features and advantages of the wheeled litter-sifting cart will be readily apparent to those of ordinary skill in the art upon reading the following detailed description of the presently preferred, but nonetheless illustrative, embodiments when taken in conjunction with the accompanying drawings.

In this respect, before explaining the current embodiments of the wheeled litter-sifting cart in detail, it is to be understood that the wheeled litter-sifting cart is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wheeled litter-sifting cart.

It is therefore important that the claims be regarded as including such equivalent construction insofar as they do not depart from the spirit and scope of the wheeled litter-sifting cart. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
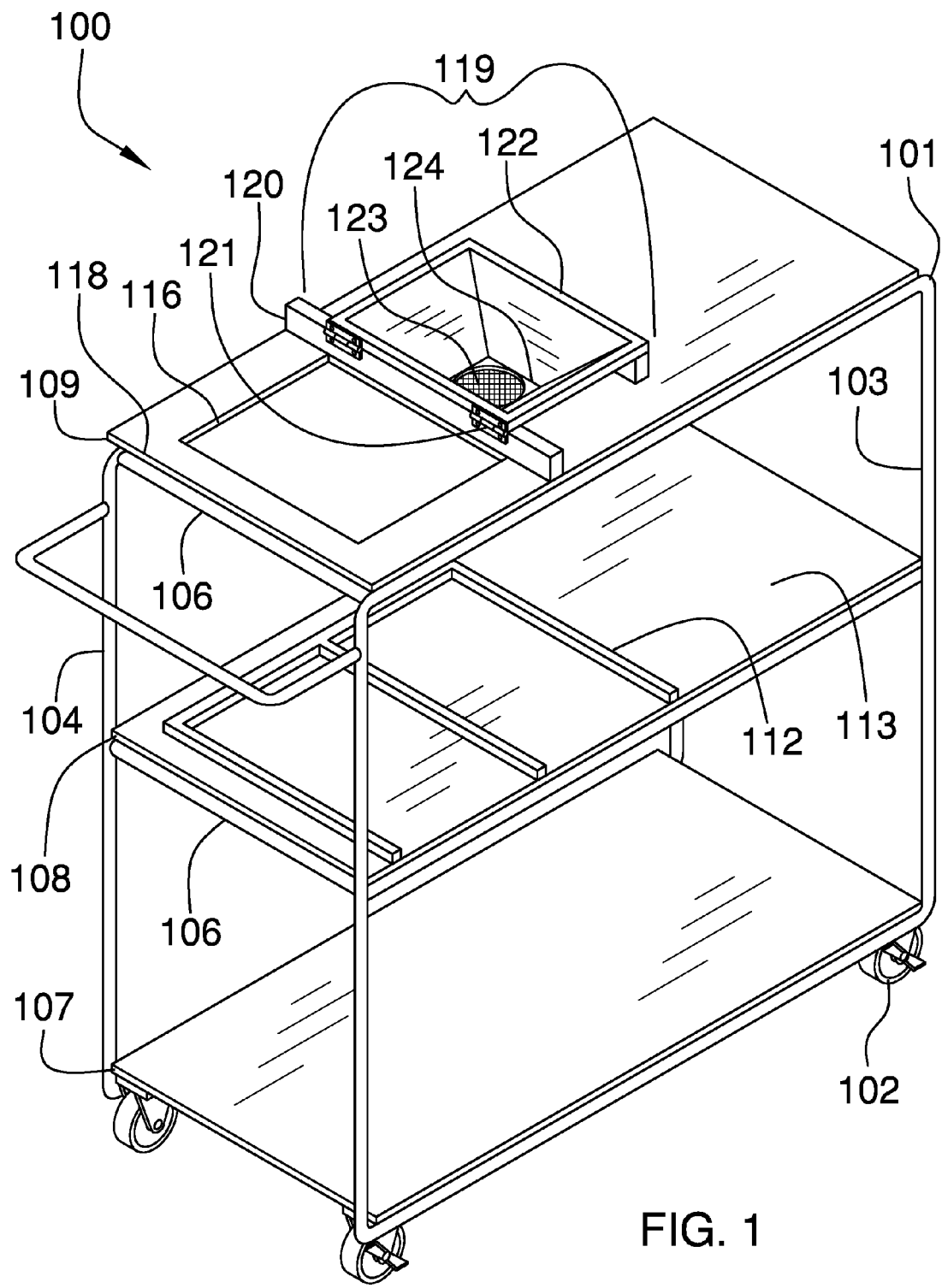
FIG. 1 is a perspective view of an embodiment of the disclosure.
Figure 2:
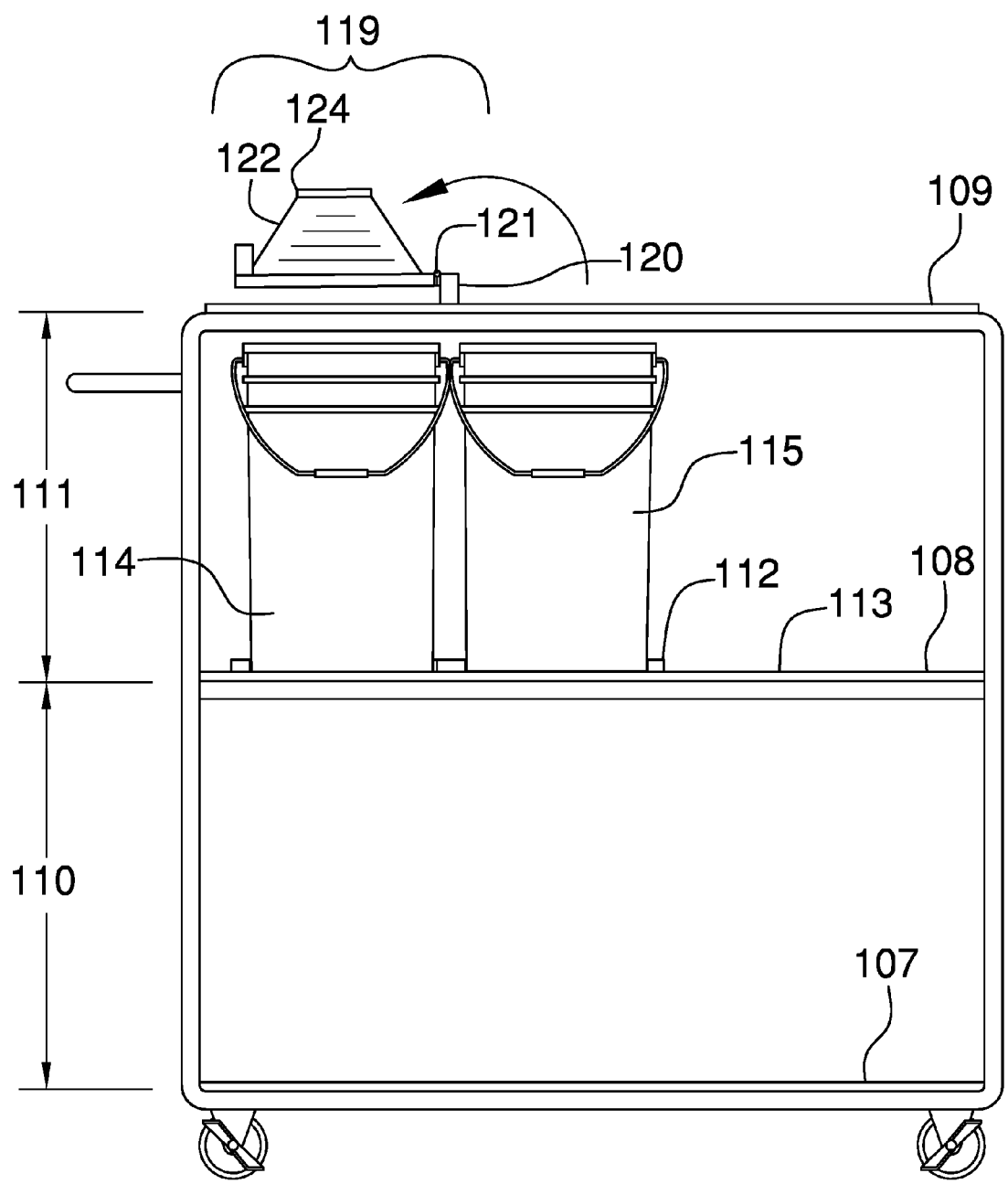
FIG. 2 is a side view of an embodiment of the disclosure.
Figure 3:
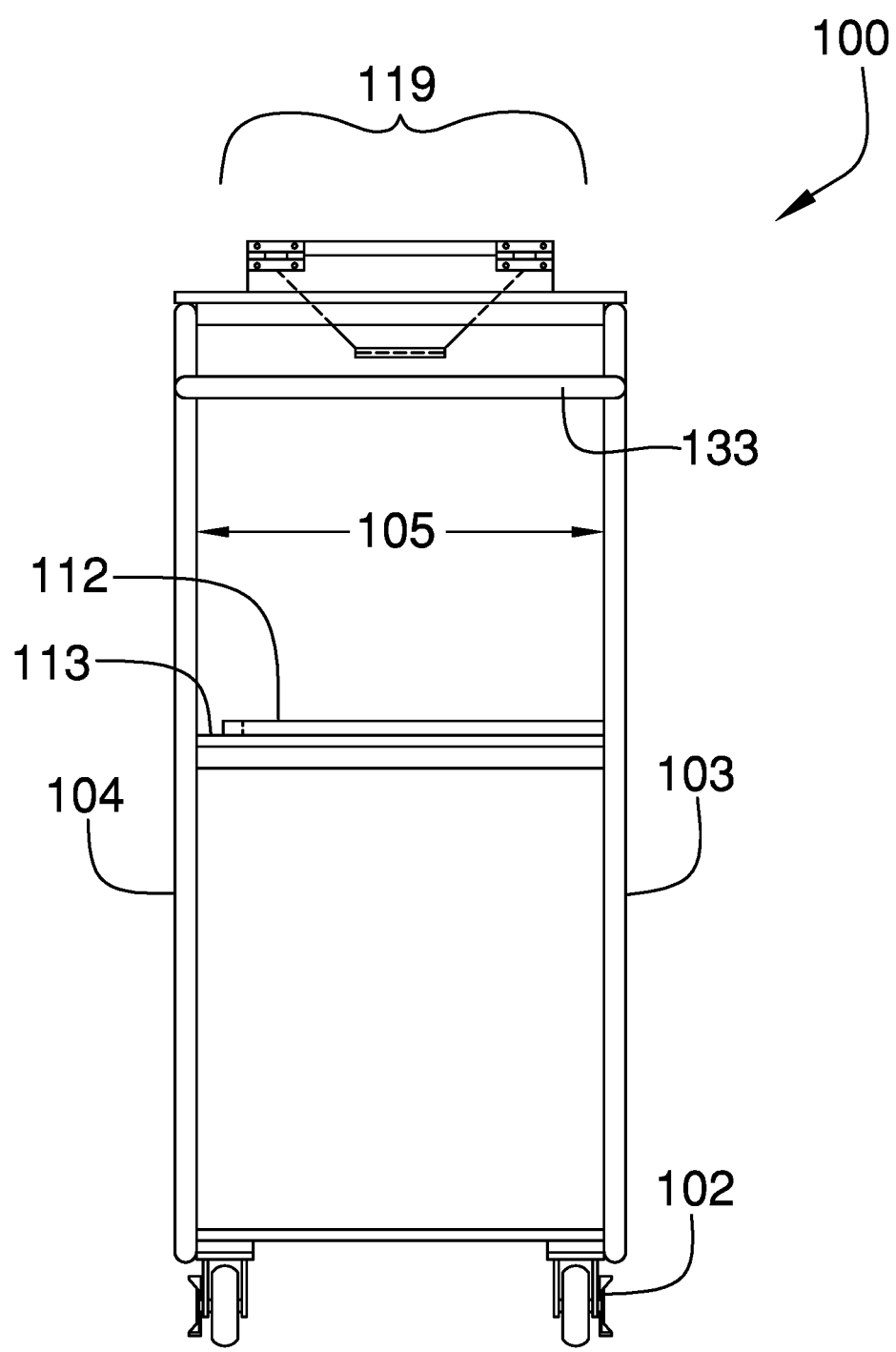
FIG. 3 is an end view of an embodiment of the disclosure.
Figure 4:
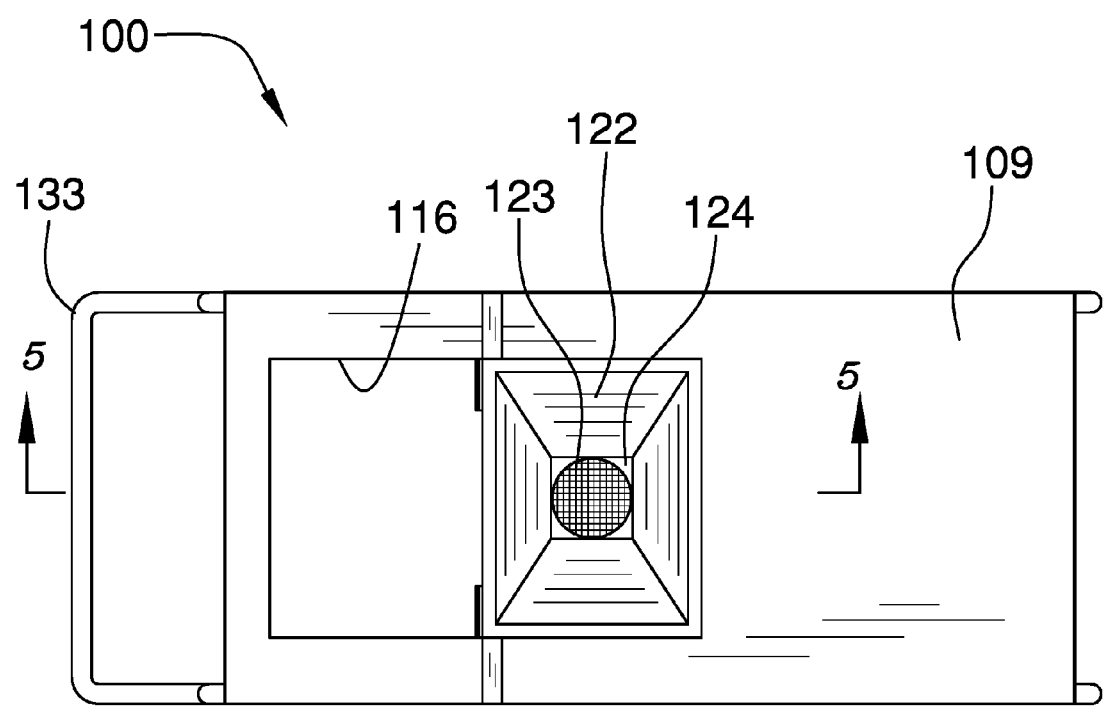
FIG. 4 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The wheeled litter-sifting cart 100 (hereinafter invention) comprises a cart frame 101 that has a plurality of wheels 102 affixed thereto. The plurality of wheels 102 are positioned beneath the cart frame 101 in order to mobilize the cart frame 101. The cart frame 101 is further defined with a first frame member 103 and a second frame member 104. Both the first frame member 103 and the second frame member 104 are generally square in shape, and are parallel with one another.

The first frame member 103 is supported a width 105 from the second frame member 104 via a plurality of lateral supports 106. The plurality of lateral supports 106 are provided at varying locales. The cart frame 101 is further defined with a bottom deck 107, an intermediate deck 108, and a top deck 109.

The bottom deck 107 is parallel with the intermediate deck and the top deck 109. The bottom deck 107, the intermediate deck 108, and the top deck 109 are equally spaced, elevationally speaking. Moreover, a first height 110 separates the bottom deck 107 from the intermediate deck 108. A second height 111 separates the intermediate deck 108 from the top deck 109. The first height 110 is equal to the second height 111.

The bottom deck 107 is ideally suited for storage. The intermediate deck 108 has a plurality of bucket guides 112 on a top surface 113. The plurality of bucket guides 112 are used to provide a proper location for a first bucket 114 and a second bucket 115, which will be discussed further.

The top deck 109 includes a first opening 116 and a second opening 117. The first opening 116 is adjacent to a first edge of the top deck 109. The second opening 117 is adjacent to the first opening 116. A hinged sifter 119 is affixed to the top deck 109. Moreover, the hinged sifter 119 is further defined with a partition member 120 that is affixed to the top deck 109 in between the first opening 116 and the second opening 117.

Figure 5:
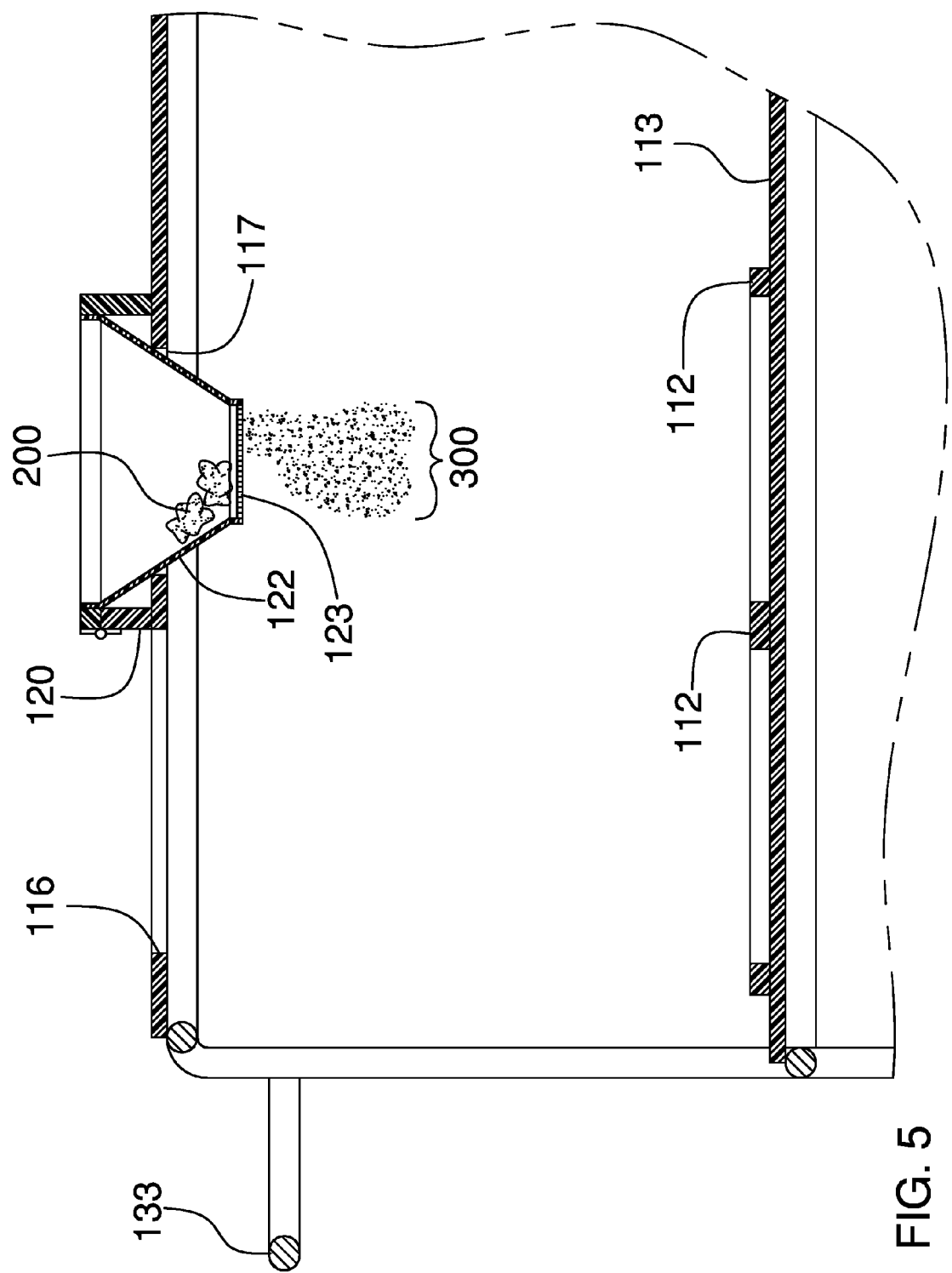
FIG. 5 is a cross-sectional view of an embodiment of the disclosure across line 5-5 in FIG. 4.

The partition member 120 is rigidly affixed to the top deck 109, and includes at least one hinge 121 attached thereon. The at least one hinge 121 is affixed to both the partition member 120 and a sifting member 122. The sifting member 122 is unique in that the sifting member 122 has a truncated pyramidal shape with a screen 123 provided at a topmost surface 124. Referring to FIG. 5, the sifting member 122 is able to be positioned in the second opening 117 such that the screen 123 is recessed below the top deck 109. The screen 123 is used to sift out clumped litter 200 from unused litter 300.

In use, the second bucket 115 is aligned underneath the second opening 117 in order for the unused litter 300 to be collected. Once all of the clumped litter 200 is separated, the sifting member 122 rotates via the at least one hinge 121 over to the first opening 116. The clumped litter 200 falls from the sifting member 122, through the first opening 116, and into the first bucket 114 that is aligned thereunder. The first bucket 114 is designated to receive the clumped litter 200; whereas the second bucket 115 is designated to receive the unused litter 300.

The cart frame 101 may include a handle 133, which is used to aid in propelling the invention 100. The cart frame 101 and all applicable components thereof may be made of a plurality of materials comprising a plastic, wood, metal, carbon fiber composite etc.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

We claim:

1. A wheeled cart comprising:
   a cart frame from which a plurality of wheels is affixed;
   wherein the cart frame includes a hinged sifter that is configured to screen clumped litter from unused litter;
   wherein the hinged sifter is positioned above a second bucket;
   wherein said unused litter is configured to pass into the second bucket, whereas the hinged sifter rotates with respect to said cart frame in order to dump said clumped litter into a first bucket;
   wherein the plurality of wheels are positioned beneath the cart frame in order to mobilize the cart frame;
   wherein the cart frame is further defined with a first frame member and a second frame member;
   wherein both the first frame member and the second frame member are generally square in shape, and are parallel with one another;
   wherein the first frame member is supported a width from the second frame member via a plurality of lateral supports;
   wherein the cart frame is further defined with a bottom deck, an intermediate deck, and a top deck;
   wherein the bottom deck is parallel with the intermediate deck and the top deck;
   wherein the bottom deck, the intermediate deck, and the top deck are equally spaced, elevationally speaking;
   wherein a first height separates the bottom deck from the intermediate deck;
   wherein a second height separates the intermediate deck from the top deck;
   wherein the first height is equal to the second height;
   wherein the intermediate deck has a plurality of bucket guides on a top surface;
   wherein the plurality of bucket guides are used to provide a proper location for the first bucket and the second bucket;
   wherein the top deck includes a first opening and a second opening;
   wherein the first opening is adjacent to a first edge of the top deck;
   wherein the second opening is adjacent to the first opening;
   wherein the hinged sifter is affixed to the top deck;
   wherein the hinged sifter is further defined with a partition member that is affixed to the top deck in between the first opening and the second opening;
   wherein the partition member is rigidly affixed to the top deck, and includes at least one hinge attached thereon;
   wherein the at least one hinge is affixed to both the partition member and a sifting member;
   wherein the sifting member has a truncated pyramidal shape with a screen provided at a topmost surface;
   wherein the sifting member is able to be positioned in the second opening such that the screen is recessed below the top deck;
   wherein the screen is configured to sift out said clumped litter from said unused litter.

2. The wheeled cart according to claim 1 wherein the second bucket is aligned underneath the second opening in order for the unused litter to be collected; wherein once all of the clumped litter is separated, the sifting member rotates via the at least one hinge over to the first opening.

3. The wheeled cart according to claim 2 wherein the clumped litter falls from the sifting member, through the first opening, and into the first bucket that is aligned thereunder.

4. The wheeled cart according to claim 3 wherein the cart frame includes a handle.

* * * * *